UNITED STATES PATENT OFFICE.

JOHN B. NORRIS, OF RICHMOND, VIRGINIA.

IMPROVEMENT IN LUBRICATING COMPOUNDS.

Specification forming part of Letters Patent No. 145,812, dated December 23, 1873; application filed August 14, 1873.

*To all whom it may concern:*

Be it known that I, JOHN B. NORRIS, of the city of Richmond, county of Henrico and State of Virginia, have invented a certain new and useful Lubricating Compound, of which the following is a specification:

This invention relates to a class of compounds used for lubricating machinery of all kinds, but more particularly designed for heavy railway transportation machinery, possessing in its nature the desired properties of not gumming, of retaining a uniform consistency, of being non-frictional, of being cooling, and non-congealable in its properties to an extraordinary degree; consequently it is not rendered thin, nor of a dirty, dripping, wasting nature, in summer, nor thick and too dense in winter temperature.

I am aware that several of the ingredients or substances entering into the combination given herein have been from time to time used as simples, and in combination; but what distinguishes my lubricator from all others is the employment of the several ingredients hereinafter specified, in the proportions given, together with the manner or mode of preparing and combining the same, so as to produce the improved lubricating properties hereinbefore mentioned, among which several ingredients I name, as being first used by me, finely-reduced cannel-coal and a compound I designate as "Seboline," this last-named ingredient being composed as follows, viz: Take a suitable vessel, into which put fifteen gallons of clean, pure, cold water, to which add twelve pounds of sal-soda, to stand until dissolved; also, take a suitable metal kettle, into which put ten gallons of clean, pure water, into which, when commencing to boil, put five pounds of concentrated lye, adding thereto twenty pounds of tallow or lard, whichever is available. Then subject the last-named ingredients to a gradual, slow, moderate degree of boiling temperature, requiring from three to four hours, and when the mass has reached a ropy or honey-like consistency, then add the dissolved sal-soda, and continue the moderate boiling a few minutes, until the several ingredients are thoroughly incorporated together, after which remove from the fire to cool, when it is fit to be used as one of the great essential components of my lubricator, the formula of which is as follows, viz: Take one pound of best quality refined lubricating-oil, one pound of residuum, three and one-fourth pounds of refined Spanish whiting, one-eighth of a pound of sal-soda, and one and one-fourth pound of seboline. The above-named ingredients must all be thoroughly mixed and tempered together in any proper receptacle by any ordinary mechanical means; to all of which add cannel-coal (previously reduced to as fine a degree as possible, so as to be free of all grit) in sufficient quantity, merely to give a proper consistency, and to serve as a vehicle to take up, absorb, and hold the oil and residuum in more complete union with the other ingredients, and also to prevent any evaporation. Lastly, after the whole mass has been thoroughly incorporated, it must be still further reduced to required consistency by any suitable grinding process, when the compound will be ready for use, and in condition for transportation in proper receptacles. The same ratio of proportion must be observed and carried out when larger quantity is required.

Having explained the nature, object, and general utility, and given a full description of the manner or mode of manufacturing my improved lubricator, what I claim as my invention is—

A lubricating compound composed of the several ingredients herein specified, viz: Lubricating-oil, residuum, Spanish whiting, sal-soda, reduced cannel-coal, concentrated lye, tallow, and water, compounded in the proportions, and in the manner, and for the purposes substantially as herein set forth and described.

JOHN B. $\overset{\text{his}}{\times}$ NORRIS.
mark.

Witnesses:
J. B. WOOD,
E. O. WOOD.